(12) United States Patent
Jing et al.

(10) Patent No.: US 9,897,478 B2
(45) Date of Patent: Feb. 20, 2018

(54) EQUIPMENT AND METHOD FOR METERING INSTILLED LIQUID CRYSTALS

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yangkun Jing, Beijing (CN); Junwei Li, Beijing (CN)

(73) Assignees: BOE TECHNOLOGY GROUP CO., LTD. (CN); HEFEI BOE OPTOELECTRONICS TECHNOLOGY CO., LTD. (CN)

( * ) Notice: Subject to any disclaimer, the term of this patent is extended or adjusted under 35 U.S.C. 154(b) by 132 days.

(21) Appl. No.: 14/745,988

(22) Filed: Jun. 22, 2015

(65) Prior Publication Data

US 2016/0259186 A1  Sep. 8, 2016

(30) Foreign Application Priority Data

Mar. 3, 2015  (CN) .......................... 2015 1 0095304

(51) Int. Cl.
   *G01G 17/00*  (2006.01)
   *G01G 15/00*  (2006.01)
   *G01G 23/10*  (2006.01)

(52) U.S. Cl.
   CPC .............. *G01G 17/00* (2013.01); *G01G 15/00* (2013.01); *G01G 23/10* (2013.01)

(58) Field of Classification Search
   CPC ......... G01G 15/00; G01G 17/00; G01G 23/10
   See application file for complete search history.

(56) References Cited

U.S. PATENT DOCUMENTS 4,094,058 A * 6/1978 Yasutake ........... G02F 1/133351
                                                      29/412
4,705,470 A * 11/1987 Penta ...................... A01J 25/12
                                                     141/256
(Continued)

FOREIGN PATENT DOCUMENTS

CA         2714538 A1 * 3/2012 ............. A47F 9/042
CN       101254692 A     9/2008
(Continued)

OTHER PUBLICATIONS

First Office Action for Chinese Application No. 201510095304.5, dated Jan. 18, 2017, 6 Pages.
(Continued)

*Primary Examiner* — Harshad R Patel
*Assistant Examiner* — Punam Roy
(74) *Attorney, Agent, or Firm* — Brooks Kushman P.C.

(57) ABSTRACT

The present disclosure provides an equipment and method for measuring weight of instilled liquid crystals, so as to improve the measurement accuracy and the measurement efficiency of the equipment for measuring weight of instilled liquid crystals. The equipment includes a tray having a plurality of holes arranged in a circle and a measuring cup arranged within each hole, a pair of scales arranged below the circle of the holes, and a driving device connected to the tray in a driving manner and configured to drive the tray to move up and down and drive the tray that has moved to a high position to rotate to a position where one measuring cup to be measured is in alignment with the pair of scales.

19 Claims, 5 Drawing Sheets

(56) References Cited

U.S. PATENT DOCUMENTS

| | | | | |
|---|---|---|---|---|
| 5,115,876 | A * | 5/1992 | Chang | G01G 15/00 177/145 |
| 5,193,630 | A * | 3/1993 | Cane | G01G 15/00 177/145 |
| 5,507,323 | A * | 4/1996 | Abe | G02F 1/1341 141/31 |
| 5,787,687 | A * | 8/1998 | Mueller | B65B 1/32 53/249 |
| 6,712,883 | B2 * | 3/2004 | Kweon | B01D 19/0005 95/260 |
| 6,776,199 | B2 * | 8/2004 | Crivellaro | B65B 1/32 141/144 |
| 6,821,176 | B2 * | 11/2004 | Lee | H01L 21/67092 349/149 |
| 6,863,194 | B2 * | 3/2005 | Kweon | B05B 1/3046 222/400.5 |
| 7,069,964 | B1 * | 7/2006 | Kakuda | B65B 3/28 141/165 |
| 7,172,729 | B2 * | 2/2007 | Las Navas Garcia | G01G 19/00 422/78 |
| 7,255,147 | B2 * | 8/2007 | Lee | B32B 38/1841 156/382 |
| 7,745,741 | B2 * | 6/2010 | Kweon | B05C 5/0225 141/83 |
| 7,767,146 | B2 * | 8/2010 | Kirschenbuhler | G01G 19/00 422/63 |
| 8,108,068 | B1 * | 1/2012 | Boucher | A61J 7/0084 700/236 |
| 8,178,799 | B2 * | 5/2012 | Luchinger | B01L 9/06 177/145 |
| 8,256,473 | B2 * | 9/2012 | Zanini | B65B 1/32 141/82 |
| 9,377,419 | B2 * | 6/2016 | Las Navas Garcia | G01N 1/44 |
| 2003/0172988 | A1 * | 9/2003 | Kweon | B05C 5/0225 141/192 |
| 2005/0205309 | A1 * | 9/2005 | Iiduka | G01G 23/10 177/185 |
| 2006/0050102 | A1 | 3/2006 | Kojima | |
| 2008/0253935 | A1 * | 10/2008 | Kane | B01F 3/18 422/400 |
| 2008/0256906 | A1 * | 10/2008 | Gamberini | G01G 17/00 53/467 |
| 2015/0183531 | A1 * | 7/2015 | Verhoest | G01G 11/08 141/1 |

FOREIGN PATENT DOCUMENTS

| | | |
|---|---|---|
| CN | 101776475 A | 7/2010 |
| CN | 102151637 A | 8/2011 |
| CN | 203535348 U | 4/2014 |
| KR | 101354224 B1 * | 1/2014 |
| KR | 101665051 B1 * | 10/2016 |

OTHER PUBLICATIONS

Second Office Action for Chinese Application No. 201510095304.5, dated Jul. 4, 2017, 5 Pages.

* cited by examiner

EQUIPMENT AND METHOD FOR METERING INSTILLED LIQUID CRYSTALS

CROSS-REFERENCE TO RELATED APPLICATIONS

The present application claims a priority of the Chinese patent application No. 201510095304.5 filed on Mar. 3, 2015, which is incorporated herein by reference in its entirety.

TECHNICAL FIELD

The present disclosure relates to the field of manufacturing liquid crystal panels, in particular to an equipment and a method for measuring the weight of instilled liquid crystals.

BACKGROUND

As one of major components of a thin film transistor liquid crystal display (TFT-LCD), a liquid crystal panel usually includes an array substrate and a color filter substrate arranged opposite to each other, a sealant adhered between the array substrate and the color filter substrate, and liquid crystals filled within a cell structure formed by the array substrate, the color filter substrate and the sealant. During the manufacturing of the liquid crystal panel, the liquid crystals are instilled onto the array substrate by one drop filling (ODF), the sealant is applied onto a periphery of the color filter substrate, and then the array substrate and the color filter substrate are arranged opposite to each other to form a liquid crystal cell.

In the process for manufacturing the liquid crystal panel, the amount of the liquid crystals in the liquid crystal cell needs to be determined in accordance with design requirements as well as tiny adjustments in the actual procedure. The liquid crystal panel is extremely sensitive to the amount of the liquid crystals, and too many or too few liquid crystals will directly lead to the occurrence of blackspots, light leakage or white light for a display image of a display device, and thereby the display quality will be adversely affected. Hence, it is required to accurately measure the amount of the liquid crystals.

SUMMARY

An object of the present disclosure is to provide an equipment and a method for measuring the weight of installed liquid crystals, so as to improve the measurement accuracy and the measurement efficiency of the equipment for measuring the weight of instilled liquid crystals.

The present disclosure provides in one embodiment an equipment for measuring the weight of instilled liquid crystals, including:
 a tray having a plurality of holes arranged in a circle and a measuring cup being arranged within each hole;
 a pair of scales arranged below the circle of the holes; and
 a driving device connected to the tray in a driving manner and configured to drive the tray to move up and down;
 wherein when the tray moves to a high position, the driving device is further configured to drive the tray to rotate to a position where one of the measuring cups to be measured is in alignment with the pair of scales.

According to this embodiment, when it is required to measure the liquid crystals in the measuring cup to be measured, the tray that has moved to the high position is driven to rotate to a position where the measuring cup to be measured is in alignment with the pair of scales, and then the tray is driven to move down so that the measuring cup to be measured naturally falls onto the pair of scales so as to measure weight of the liquid crystals. After the liquid crystals in the current measuring cup have been measured, the above procedure may be repeated until the weight of the liquid crystals in all the measuring cups has been measured. In this solution, the tray may be driven by a driving device to move up and down as well as rotate, while the pair of scales is stationary. As compared with the related art, it is unnecessary in the present disclosure to move the pair of scales up and down, and the pair of scales may enter into a stable state rapidly. As a result, it is able to improve the measurement efficiency of the equipment for measuring the weight of instilled liquid crystals. In addition, a position of the pair of scales is fixed and remains unchanged, which also helps to improve the measurement accuracy of the equipment for measuring weight of instilled liquid crystals and prolong a service life of the pair of scales.

Alternatively, there are at least two pairs of scales, and a number of the holes in the tray is an integral multiple of a number of the pairs of scales. In this way, weight of the liquid crystals in the measuring cups may be simultaneously measured by the at least two pairs of scales, thereby to improve the measurement efficiency of the equipment for measuring the weight of instilled liquid crystals.

Alternatively, the holes are arranged at a regular interval in the circle, and the at least two pairs of scales are arranged below the circle of the holes at a regular interval. This solution helps to optimize a procedure of measuring weight of the liquid crystals in the measuring cups of the tray, thereby to further improve the measuring weight of efficiency of the equipment for measuring weight of instilled liquid crystals.

Alternatively, the equipment for measuring the weight of instilled liquid crystals further includes a vibration sensor and a vibration compensator. The vibration sensor is configured to detect vibration information of the pair of scales. The vibration compensator is in communication with the vibration sensor, and configured to, when an electric signal corresponding to the vibration information of the pair of scales exceeds a predetermined signal threshold, apply a control force to the pair of scales in a direction opposite to a vibration direction of the pair of scales in accordance with the vibration information of the pair of scales. Before the instillation of the liquid crystals into the measuring cup, vibration control is performed on the pair of scales, so as to eliminate an effect caused by the vibration of the pair of scales on a measurement result, thereby to further improve the measurement accuracy of the equipment for measuring weight of instilled liquid crystals.

Alternatively, the equipment for measuring weight of instilled liquid crystals further includes an electromagnetic force balance sensor configured to detect vibration information of the pair of scales during the instillation of the liquid crystals. The vibration compensator is further in communication with the electromagnetic force balance sensor, and configured to apply a compensating control force to the pair of scales in a direction opposite to a vibration direction of the pair of scales during the instillation of the liquid crystals in accordance with the vibration information of the scale body during the instillation of the liquid crystals. During the instillation of the liquid crystals, compensating vibration control is performed on the pair of scales, so as to provide a more accurate measurement result.

Alternatively, the driving device includes:
a base;
a driving cylinder secured onto the base and configured to vertically extend and retract;
a support fixedly connected to a telescopic end of the driving cylinder; and
a driving unit secured onto the support, an output shaft of the driving unit being connected to a center support member of the tray in a driving manner.

The telescopic movement of the driving cylinder may drive the support and the driving unit to move up and down, thereby to drive the tray to move up and down. Because the output shaft of the driving unit is connected to the center support member of the tray in a driving manner, the output shaft of the driving unit may drive the tray to rotate, so as to provide a simple and reliable structure.

Alternatively, the driving device further includes a vertical guiding rod secured onto the base, and the support is slidingly fitted to the vertical guiding rod. The vertical guiding rod may be used to guide the up-and-down movement of the support, so as to provide stable and reliable driving.

Alternatively, a linear bearing is arranged between the support and the vertical guiding rod, so as to reduce a drive friction coefficient, thereby to provide the stable and reliable driving.

Alternatively, the driving cylinder includes a hydraulic cylinder or a pneumatic cylinder, and the driving unit includes a motor or an electric machine.

Alternatively, when there are at least two pairs of scales, each scale is secured onto a support platform which is secured onto the base. A cup holder is arranged on each scale, and top surfaces of the cup holders are located at an identical level. In this way, when the tray moves down, the measuring cup to be measured above each pair of scales may naturally fall onto the corresponding cup holder simultaneously at an identical level, and the pairs of scales may enter into a balance state simultaneously and rapidly. As a result, the measurement efficiency of the equipment for measuring the weight of instilled liquid crystals may be further improved.

Base on the above technical solutions of the equipment for measuring weight of instilled liquid crystals, the present disclosure further provides in one embodiment a method for measuring the weight of the instilled liquid crystals, including:
detecting vibration information of a pair of scales;
applying a control force to the pair of scales in a direction opposite to a vibration direction of the pair of scales in accordance with the vibration information of the pair of scales when an electric signal corresponding to the vibration information of the pair of scales exceeds a predetermined signal threshold; and
instilling liquid crystals into a measuring cup when the electric signal corresponding to the vibration information of the pair of scales does not exceed the predetermined signal threshold, and measuring the weight of the liquid crystals in the measuring cup.

Alternatively, the method further includes detecting vibration information of the pair of scales when instilling the liquid crystals; and applying a compensating control force to the pair of scales in a direction opposite to a vibration direction of the pair of scales when instilling the liquid crystals in accordance with the vibration information of the pair of scales when instilling the liquid crystals.

Base on the above technical solutions of the equipment for measuring weight of instilled liquid crystals, the present disclosure further provides in one embodiment a method for measuring weight of instilled liquid crystals, including:
driving, by a driving device of the equipment for measuring the weight of instilled liquid crystals, a tray of the equipment for measuring the weight of instilled liquid crystals to move up to a high position, and driving the tray that has moved to the high position to rotate to a position where a measuring cup is in alignment with a pair of scales that is stationary in the equipment for measuring the weight of instilled liquid crystals;
driving, by the driving device, the tray to move down so that the measuring cup naturally falls onto the pair of scales; and
instilling liquid crystals into the measuring cup by a nozzle of the equipment for measuring the weight of instilled liquid crystals, and measuring the weight of the instilled liquid crystals in the measuring cup by the pair of scales.

Alternatively, the equipment for measuring weight of instilled liquid crystals includes a vibration sensor and a vibration compensator, and the vibration compensator is in communication with the vibration sensor. After driving, by the driving device, the tray to move down so that the measuring cup naturally falls onto the pair of scales, and before instilling liquid crystals into the measuring cup by a nozzle of the equipment for measuring weight of instilled liquid crystals, the method further includes:
detecting, by the vibration sensor, vibration information of the pair of scales;
judging whether or not an electric signal corresponding to the vibration information of the pair of scales exceeds a predetermined signal threshold;
when the electric signal corresponding to the vibration information of the pair of scales exceeds the predetermined signal threshold, applying, by the vibration compensator, a control force to the pair of scales in a direction opposite to a vibration direction of the pair of scales in accordance with the vibration information of the pair of scales until the electric signal corresponding to the vibration information of the pair of scales is lowered to be less than the predetermined signal threshold; and
when the electric signal corresponding to the vibration information of the pair of scales does not exceed or is lowered to be less than the predetermined signal threshold, instilling the liquid crystals into the measuring cup by the nozzle.

Alternatively, the equipment for measuring weight of instilled liquid crystals further includes an electromagnetic force balance sensor, and the vibration compensator is further in communication with the electromagnetic force balance sensor. When instilling liquid crystals into the measuring cup by a nozzle of the equipment for measuring weight of instilled liquid crystals, the method further includes:
detecting vibration information of the pair of scales by the electromagnetic force balance sensor; and
applying, by the vibration compensator, a compensating control force to the pair of scales in a direction opposite to a vibration direction of the pair of scales when instilling liquid crystals in accordance with the vibration information of the pair of scales when instilling liquid crystals.

DETAILED DESCRIPTION

In a process for manufacturing a liquid crystal panel, liquid crystals may be instilled into a measuring cup by an instillation device and then measured by a pair of scales. An equipment for measuring the weight of instilled liquid crystals includes a rotatable tray, a pair of scales and a lifting mechanism. The tray has a plurality of holes arranged in a circle and a measuring cup arranged within each hole. The pair of scales is arranged below the tray, and may be driven by the lifting mechanism to move up and down. When the tray is rotated to a position where one of the measuring cups is located above the pair of scales, the pair of scales moves up until it reaches a high position. When the pair of scales is at a stable state, the liquid crystals are instilled into the measuring cup by the instillation device until the amount thereof reaches a predetermined measurement value. After the instillation, the pair of scales moves down to a low position. In this way, the measurement of weight of the instilled liquid crystals in one measuring cup is completed. By controlling the rotation of the tray and repeating the above-mentioned procedure, it is able to measure the weight of the instilled liquid crystals in each measuring cup on the tray.

During the above-mentioned procedure, the inventor finds for the first time that the measurement accuracy of the pair of scales, as a measurement device with high accuracy, is adversely affected due to frequent up-and-down movements. In addition, before the instillation of liquid crystals into each measuring cup, it is required to ensure that the pair of scales is at a stable state, so it will take more time to measure the instilled liquid crystals, and thereby the measurement efficiency is relatively low.

In order to improve the measurement accuracy and the measurement efficiency, the present disclosure provides in one embodiment an equipment and a method for measuring weight of instilled liquid crystals. In order to make the objects, the technical solutions and the advantages of the present disclosure more apparent, the present disclosure will be described hereinafter in conjunction with the drawings and embodiments.

Figure 1:
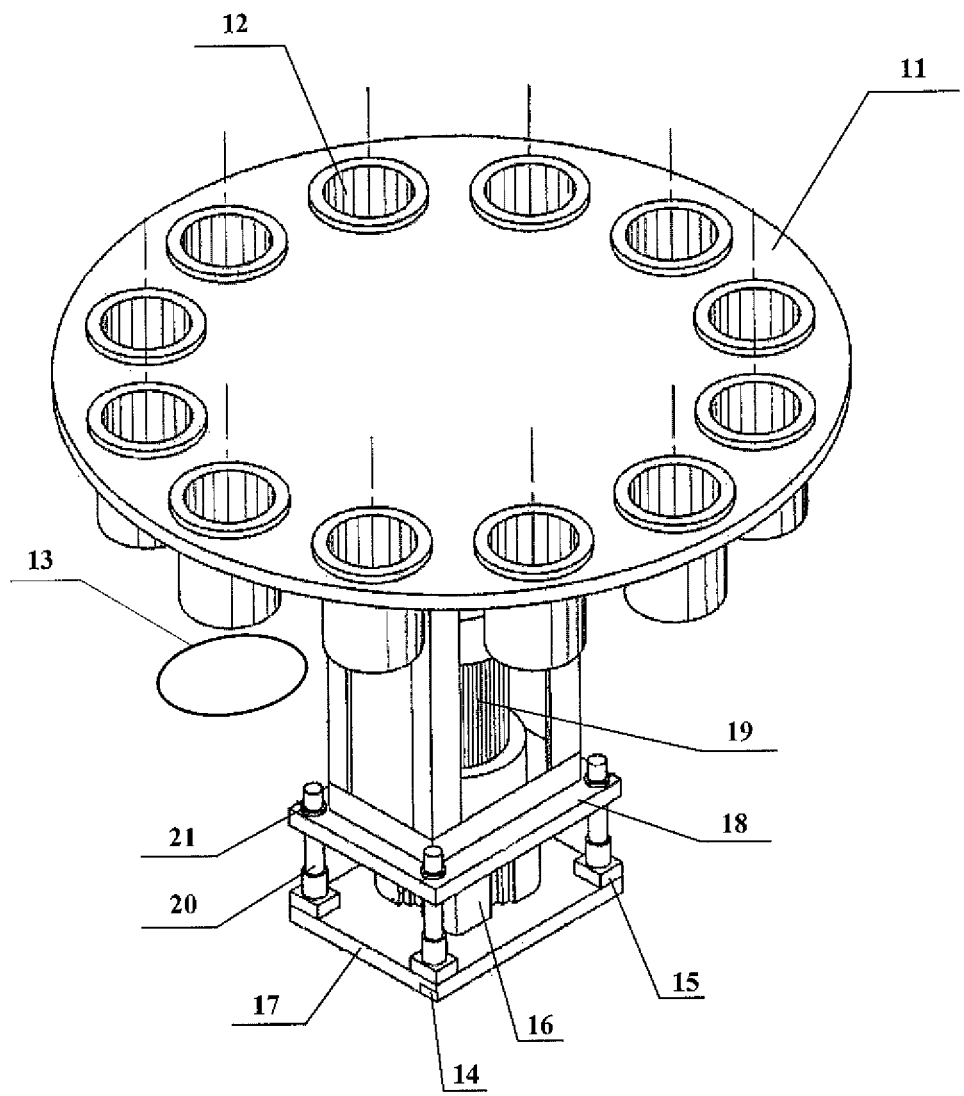
FIG. 1 is a three-dimensional structure diagram of an equipment for measuring weight of instilled liquid crystals according to one embodiment of the present disclosure.
Figure 2:
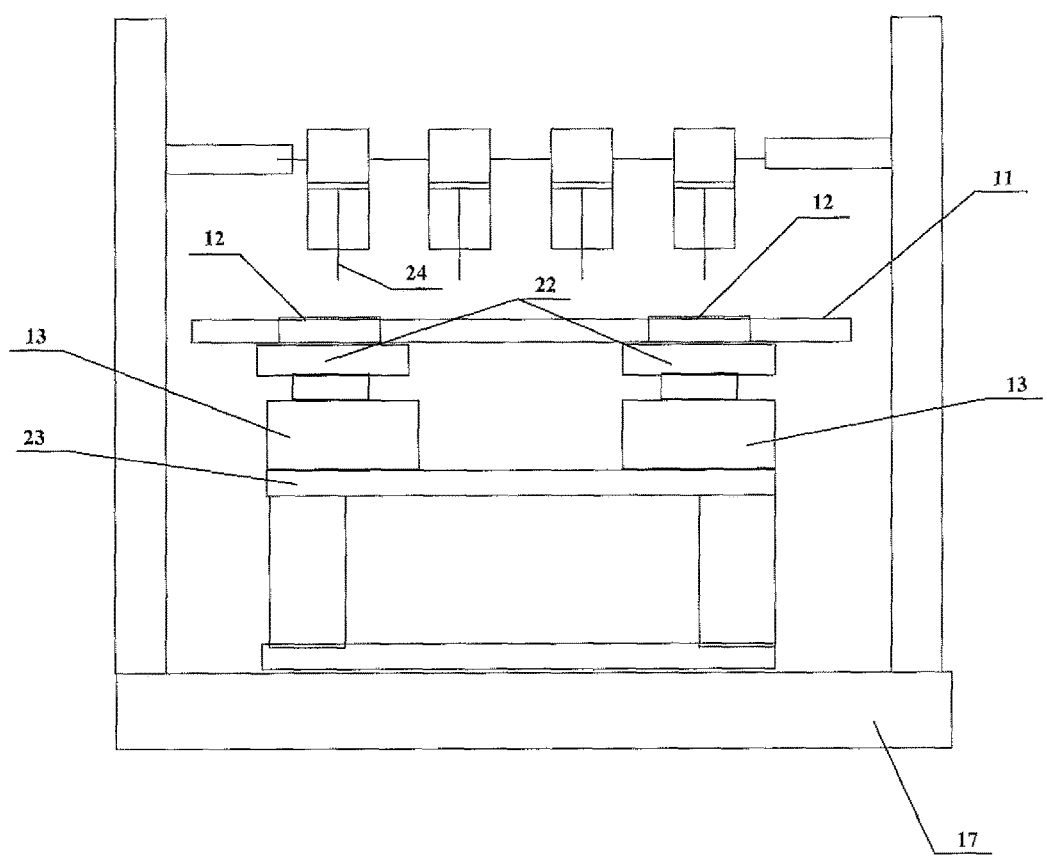
FIG. 2 is a front view of the equipment for measuring weight of instilled liquid crystals according to one embodiment of the present disclosure.
Figure 3:
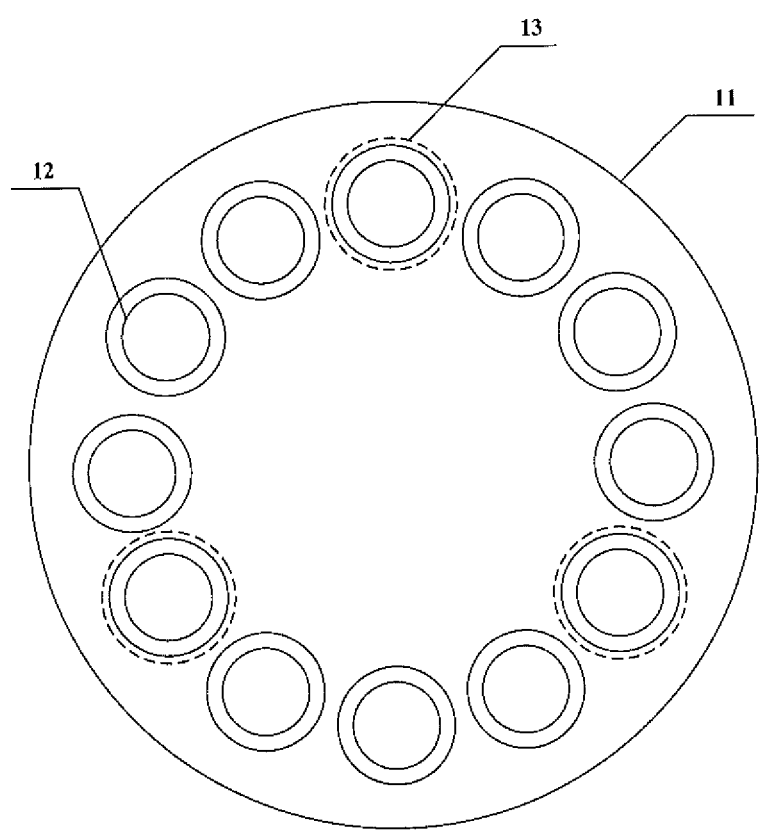
FIG. 3 is a top view of a tray according to one embodiment of the present disclosure.

FIG. 1 is a three-dimensional structure diagram of an equipment for measuring the weight of instilled liquid crystals according to one embodiment of the present disclosure. FIG. 1 mainly shows such members as a tray and a driving device. FIG. 2 is a front view of the equipment for measuring the weight of instilled liquid crystals according to one embodiment of the present disclosure. FIG. 2 mainly shows such members as a nozzle, the tray and a pair of scales. FIG. 3 is a top view of the tray according to one embodiment of the present disclosure.

As shown in FIGS. 1 to 3, the equipment for measuring the weight of instilled liquid crystals according to one embodiment of the present disclosure includes:

a tray 11 having a plurality of holes arranged in a circle and a measuring cup 12 arranged within each hole;

a pair of scales 13 arranged below the circle of holes; and a driving device connected to the tray 11 in a driving manner, and configured to drive the tray 11 to move up and down, and drive the tray 11 that has moved to a high position to rotate to a position where a measuring cup 12 to be measured is in alignment with the pair of scales 13.

In one embodiment of the present disclosure, the pair of scales 13 being arranged below the circle of the plurality of holes means that the pair of scales 13 is arranged right below a circular region which takes a center of the tray 11 as a center of a circle and includes the plurality of holes. In this way, through the rotation of the tray 11 that has moved to the high position, a position of the measuring cup 12 to be measured may be adjusted to be aligned with the pair of scales 13. When the tray 11 moves down, the measuring cup 12 to be measured may naturally fall onto the corresponding pair of scales 13.

The number of the pairs of scales 13 and the number of the holes in the tray 11 are not particularly defined herein. Alternatively, as shown in FIG. 3, there are at least two pairs of scales 13, and the number of the holes in the tray 11 is an integral multiple of the number of the pairs of scales 13. In this way, the liquid crystals in the measuring cups 12 may be simultaneously measured by the at least two pairs of scales 13, so as to improve the measurement efficiency of the equipment for measuring the weight of instilled liquid crystals. Alternatively, the plurality of holes is arranged in the circle at a regular interval, and the at least two pairs of scales 13 are arranged at a regular interval below the circle of the plurality of holes. This helps to optimize an entire procedure of measuring the weight of the liquid crystals in the measuring cups of the tray, thereby to further improve the measurement efficiency of the equipment for measuring weight of instilled liquid crystals.

As show in FIG. 3, there are twelve holes in the tray 11 and three pairs of scales 13, and the three pairs of scales 13 are arranged at a regular interval below a circle of the twelve holes. In this way, every time when the tray 11 is rotated by 30°, the weight of the liquid crystals in three measuring cups 12 may be simultaneously measured by the three scales 13. Hence, the weight of the liquid crystals in the twelve measuring cups 12 on the tray 11 may be measured by merely rotating the tray 11 at least four times.

In the technical solution of one embodiment of the present disclosure, when it is required to measure weight of the liquid crystals in the measuring cup 12 to be measured, the tray 11 that has moved to the high position is first driven to rotate to a position where the measuring cup 12 to be measured is in alignment with the pair of scales 13, the tray 11 is driven to move down until the measuring cup 12 to be measured naturally falls onto the pair of scales 13, then the liquid crystals are instilled into the measuring cup 12 by a nozzle 24 above the measuring cup 12, and then weight of the liquid crystals in the measuring cup 12 is measured by the pair of scales 13. After the weight of the liquid crystals in the current measuring cup has been measured, the above procedure may be repeated until weight of the liquid crystals in all the measuring cups has been measured. In this solution, the tray 11 may be driven by the driving device to move up and down as well as rotate, while a position of the pair of scales 13 is fixed and not changed. As compared with the related art, it is unnecessary in one embodiment of the present disclosure to move the pair of scales 13 up and down, so the pair of scales 13 may enter into a stable state rapidly. As a result, the measurement efficiency of the equipment for measuring weight of instilled liquid crystals is improved. In addition, the position of the pair of scales 13 is fixed and remains unchanged, which also helps to improve the measurement accuracy of the equipment for measuring weight of instilled liquid crystals and prolong a service life of the pair of scales 13.

As shown in FIG. 1, the driving device includes:

a base 17;

a driving cylinder (not shown) secured onto the base 17 and configured to vertically extend and retract;

a support 18 fixedly connected to a telescopic end of the driving cylinder; and a driving unit 19 secured onto the support 18, an output shaft of the driving unit 19 being connected to a center support member of the tray 11 in a driving manner.

The driving cylinder may be a hydraulic cylinder or a pneumatic cylinder, and the driving unit 19 may be a motor or an electric machine. The telescopic movement of the driving cylinder may drive the support 18 and the driving unit 19 to move up and down, thereby to drive the tray 11 to move up and down. Because the output shaft of the driving unit 19 is connected to the center support member of the tray 11 in a driving manner, the output shaft of the driving unit 19 may drive the tray 11 to rotate, so as to provide a simple and reliable structure.

As shown in FIG. 1, alternatively, the driving device further includes a vertical guiding rod 20 secured onto the base 17, and the support 18 is slidingly fitted to the vertical guiding rod 20. The vertical guiding rod 20 may be used to guide the up-and-down movement of the support 18, so as to provide stable and reliable driving. The number of the vertical guiding rods 20 may be set in accordance with the structure of the support 18. In FIG. 1, there are four vertical guiding rods 20.

Alternatively, a linear bearing 21 is arranged between the support 18 and the vertical guiding rod 20, so as to reduce a drive friction coefficient, thereby to provide stable and reliable driving.

The pair of scales is arranged at a specific position in advance, and may be arranged independently of the tray and the driving device, as show in FIG. 1. Alternatively, as shown in FIG. 2, when there are at least two pairs of scales 13, each pair of scales 13 is secured onto a support platform 23 which is secured onto the base 17. A cup holder 22 is arranged on each pair of scales 13, and top surfaces of the cup holders 22 are located at an identical level. A height of the support platform 23 may be set in accordance with a space below the tray 11. The cup holders 22 may be of different thicknesses, as long as the top surfaces of the cup holders 22 are located at an identical level. In this way, when the tray 11 moves down, the measuring cup 12 to be measured above each pair of scales 13 may naturally fall onto the corresponding cup holder 22 simultaneously at an identical level, and the pairs of scales 13 may enter into a balance state simultaneously and rapidly. As a result, the measurement efficiency of the equipment for measuring weight of instilled liquid crystals may be further improved.

As shown in FIG. 1, alternatively, the equipment for measuring weight of instilled liquid crystals further includes a vibration sensor 14 and a vibration compensator 15. The vibration sensor 14 is configured to detect vibration information of a pair of scales. The vibration compensator 15 is in communication with the vibration sensor 14, and configured to, when an electric signal corresponding to the vibration information of the pair of scales exceeds a predetermined signal threshold, apply a control force to the pair of scales in a direction opposite to a vibration direction of the pair of scales in accordance with the vibration information of the pair of scales. As shown in FIG. 2, because the pair of scales 13 is secured onto the support platform 23 which is secured on the base 17, the vibration information of the pair of scales may be detected by detecting vibration information of the base 17.

When the electric signal corresponding to the vibration information of the pair of scales exceeds the predetermined signal threshold, the vibration compensator 15 may apply the control force to the pair of scales in a direction opposite to the vibration direction of the pair of scales, so as to cancel out the vibration and enable the electric signal corresponding to the vibration information of the pair of scales to be less than the predetermined signal threshold. This solution may rapidly reduce the vibration of the pair of scales, thereby to improve the measurement efficiency and the measurement accuracy of the equipment for measuring the weight of instilled liquid crystals. In addition, this solution may also effectively prevent the pair of scales from being damaged due to serious vibrations, thereby to prolong a service life of the pair of scales.

In an alternative embodiment, the equipment for measuring the weight of instilled liquid crystals further includes an electromagnetic force balance sensor 16 configured to detect vibration information of the pair of scales during the instillation of liquid crystals. The vibration compensator 15 is further in communication with the electromagnetic force balance sensor 16, and configured to apply a compensating control force to the pair of scales in a direction opposite to the vibration direction in accordance with the vibration information of the pair of scales during the instillation of liquid crystals. This solution may compensate for tiny vibrations, thereby to eliminate an effect caused by the vibration on a measurement result and provide a more accurate measurement result.

Figure 4:
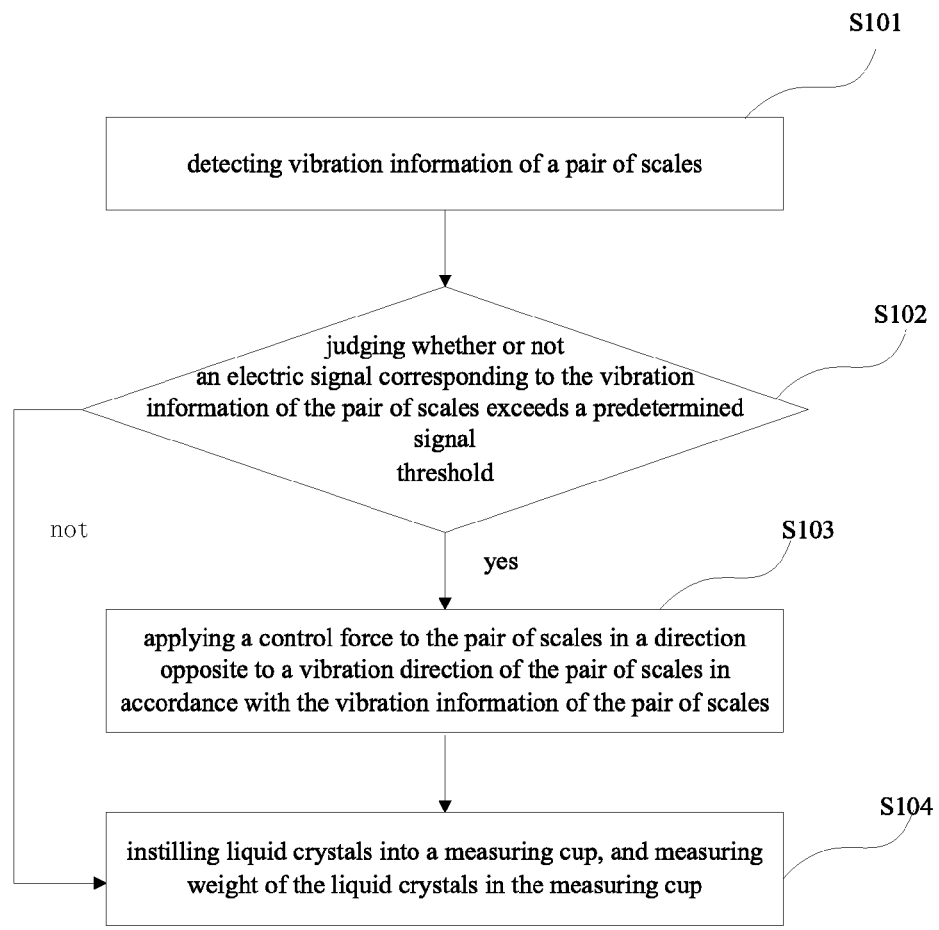
FIG. 4 is a flow chart of a method for measuring weight of instilled liquid crystals according to one embodiment of the present disclosure.

As shown in FIG. 4, the present disclosure further provides in one embodiment a method for measuring the weight of instilled liquid crystals, including:

Step S101: detecting vibration information of a pair of scales;

Step S102: judging whether or not an electric signal corresponding to the vibration information of the pair of scales exceeds a predetermined signal threshold; if yes, proceeding to Step S103, otherwise, proceeding to Step S104;

Step S103: applying a control force to the pair of scales in a direction opposite to a vibration direction of the pair of scales in accordance with the vibration information of the pair of scales; and Step S104: instilling liquid crystals into a measuring cup, and measuring the weight of the liquid crystals in the measuring cup.

Before instilling the liquid crystals into the measuring cup, vibration control may be performed on the pair of scales, so as to eliminate an effect caused by the vibration of the pair of scales onto a measurement result, thereby to further improve the measurement accuracy of the equipment for measuring weight of instilled liquid crystals.

Figure 5:
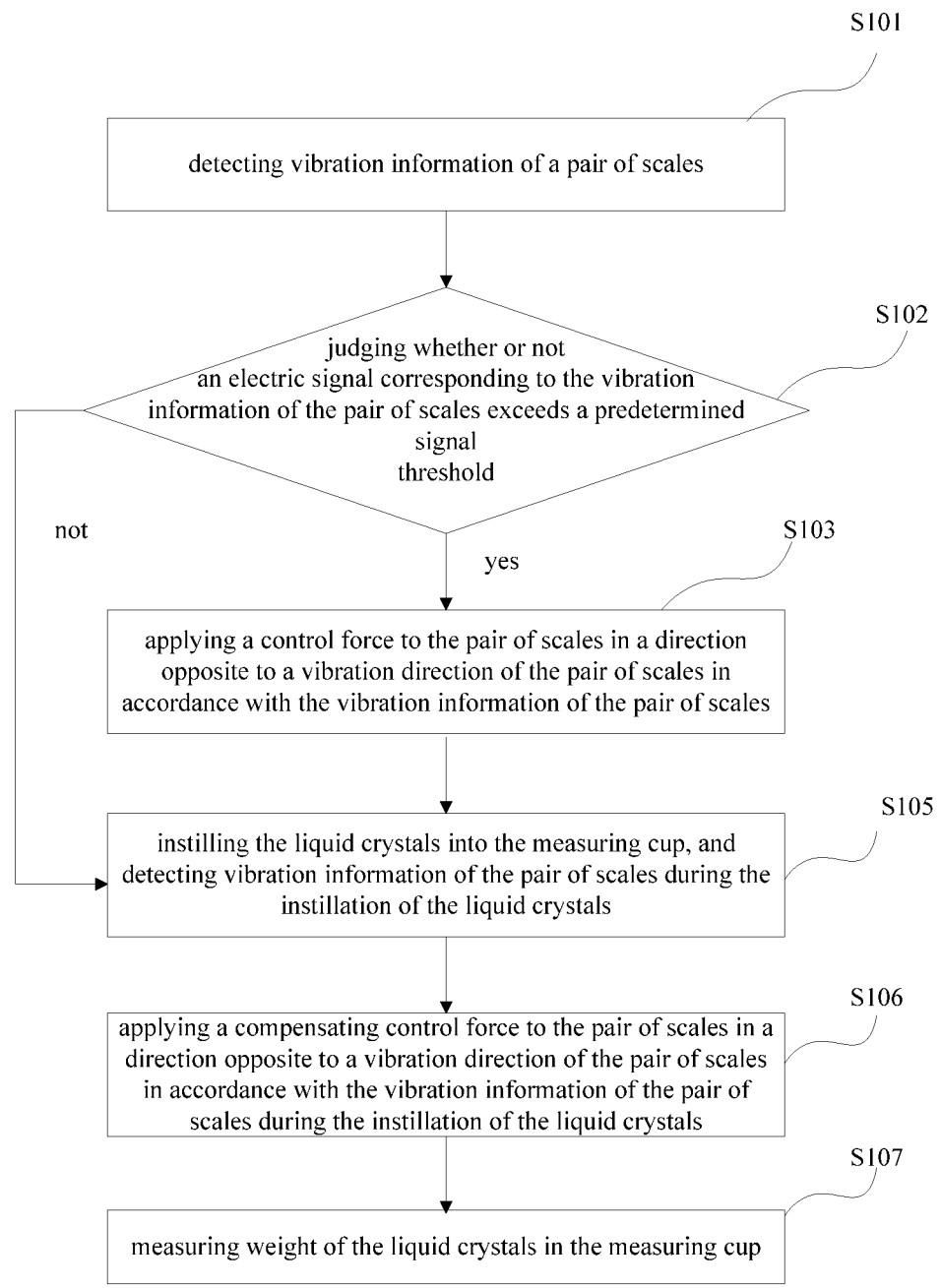
FIG. 5 is a flow chart of a method for measuring weight of instilled liquid crystals according to another embodiment of the present disclosure.

As shown in FIG. 5, alternatively, on the basis of the steps S101 to S103, the method further includes following steps (when judging in Step S102 that the electric signal corresponding to the vibration information of the pair of scales does not exceed the predetermined signal threshold, Step 105 may be directly performed):

Step S105: instilling the liquid crystals into the measuring cup, and detecting vibration information of the pair of scales during the instillation of the liquid crystals;

Step S106: applying a compensating control force to the pair of scales in a direction opposite to a vibration direction of the pair of scales in accordance with the vibration information of the pair of scales during the instillation of the liquid crystals; and Step S107: measuring weight of the liquid crystals in the measuring cup.

According to this embodiment, it is able to compensate for tiny vibrations, thereby to eliminate an effect caused by the vibration on a measurement result and to provide a more accurate measurement result.

Obviously, a person skilled in the art may make further modifications and improvements without departing from the spirit of the present disclosure. If these modifications and improvements fall within the scope of appended claims and equivalents thereof, the present disclosure also intends to include them.

What is claimed is:

1. An equipment for measuring the weight of instilled liquid crystals, comprising:
 a tray having a plurality of holes arranged in a circle and a measuring cup being arranged within each hole;
 a pair of scales arranged below the circle of the holes; and
 a driving device connected to the tray in a driving manner and configured to drive the tray to move up and down;
 wherein when the tray moves to a high position, the driving device is further configured to drive the tray to rotate to a position where one of the measuring cups to be measured is in alignment with the pair of scales;
 wherein the equipment further comprises a vibration sensor and a vibration compensator;
 wherein the vibration sensor is configured to detect vibration information of the pair of scales; and
 the vibration compensator is in communication with the vibration sensor, and configured to, when an electric signal corresponding to the vibration information of the pair of scales exceeds a predetermined signal threshold, apply a control force to the pair of scales in a direction opposite to a vibration direction of the pair of scales in accordance with the vibration information of the pair of scales.

2. The equipment according to claim 1, wherein there are at least two pairs of scales, and a number of the holes in the tray is an integral multiple of a number of pairs of the scales.

3. The equipment according to claim 2, wherein the holes are arranged at a regular interval in the circle; the at least two pairs of scales are arranged below the circle of the holes at a regular interval.

4. The equipment according to claim 1, further comprising an electromagnetic force balance sensor configured to detect vibration information of the pair of scales when instilling liquid crystals;
 wherein the vibration compensator is further in communication with the electromagnetic force balance sensor, and configured to apply a compensating control force to the pair of scales in a direction opposite to a vibration direction of the pair of scales when instilling the liquid crystals in accordance with the vibration information of the scale body when instilling the liquid crystals.

5. The equipment according to claim 1, wherein the driving device comprises:
 a base;
 a driving cylinder secured onto the base and configured to vertically extend and retract;
 a support fixedly connected to a telescopic end of the driving cylinder; and
 a driving unit secured onto the support, an output shaft of the driving unit being connected to a center support member of the tray in a driving manner.

6. The equipment according to claim 5, wherein the driving device further comprises a vertical guiding rod secured onto the base, and the support is slidingly fitted to the vertical guiding rod.

7. The equipment according to claim 6, wherein a linear bearing is arranged between the support and the vertical guiding rod.

8. The equipment according to claim 5, wherein the driving cylinder comprises a hydraulic cylinder or a pneumatic cylinder, and the driving unit comprises a motor or an electric machine.

9. The equipment according to claim 5, wherein when there are at least two pairs of scales, each pair of scales is secured onto a support platform which is secured onto the base; each pair of scales is provided with a cup holder, and top surfaces of the cup holders are located at an identical level.

10. A method for measuring the weight of instilled liquid crystals using the equipment according to claim 1, comprising:
 driving, by a driving device of the equipment, a tray of the equipment to move up to a high position, and driving the tray that has moved to the high position to rotate to a position where a measuring cup is in alignment with a pair of scales that is stationary in the equipment;
 driving, by the driving device, the tray to move down so that the measuring cup naturally falls onto the pair of scales; and
 instilling liquid crystals into the measuring cup by a nozzle of the equipment, and measuring weight of the instilled liquid crystals in the measuring cup by the pair of scales.

11. The method according to claim 10, wherein the equipment comprises a vibration sensor and a vibration compensator, and the vibration compensator is in communication with the vibration sensor; and
 after driving, by the driving device, the tray to move down so that the measuring cup naturally falls onto the pair of scales, and before instilling liquid crystals into the measuring cup by a nozzle of the equipment, the method further comprises:
 detecting, by the vibration sensor, vibration information of the pair of scales;
 judging whether or not an electric signal corresponding to the vibration information of the pair of scales exceeds a predetermined signal threshold;
 when the electric signal corresponding to the vibration information of the pair of scales exceeds the predetermined signal threshold, applying, by the vibration compensator, a control force to the pair of scales in a direction opposite to a vibration direction of the pair of scales in accordance with the vibration information of the pair of scales until the electric signal corresponding to the vibration information of the pair of scales is lowered to be less than the predetermined signal threshold; and
 when the electric signal corresponding to the vibration information of the pair of scales does not exceed or is lowered to be less than the predetermined signal threshold, instilling the liquid crystals into the measuring cup by the nozzle.

12. The method according to claim 11, wherein the equipment further comprises an electromagnetic force balance sensor, and the vibration compensator is further in communication with the electromagnetic force balance sensor;

when instilling liquid crystals into the measuring cup by a nozzle of the equipment for measuring weight of instilled liquid crystals, the method further comprises:

detecting vibration information of the pair of scales by the electromagnetic force balance sensor; and applying, by the vibration compensator, a compensating control force to the pair of scales in a direction opposite to a vibration direction of the pair of scales when instilling liquid crystals in accordance with the vibration information of the pair of scales when instilling liquid crystals.

13. A method for measuring weight of instilled liquid crystals, comprising:

detecting vibration information of a pair of scales;

applying a control force to the pair of scales in a direction opposite to a vibration direction of the pair of scales in accordance with the vibration information of the pair of scales when an electric signal corresponding to the vibration information of the pair of scales exceeds a predetermined signal threshold; and instilling liquid crystals into a measuring cup when the electric signal corresponding to the vibration information of the pair of scales does not exceed the predetermined signal threshold, and measuring weight of the liquid crystals in the measuring cup.

14. The method according to claim 13, further comprising:

detecting vibration information of the pair of scales when instilling the liquid crystals; and applying a compensating control force to the pair of scales in a direction opposite to a vibration direction of the pair of scales when instilling the liquid crystals in accordance with the vibration information of the pair of scales when instilling the liquid crystals.

15. An equipment for measuring the weight of instilled liquid crystals, comprising:

a tray having a plurality of holes arranged in a circle and a measuring cup being arranged within each hole;

a pair of scales arranged below the circle of the holes; and a driving device connected to the tray in a driving manner and configured to drive the tray to move up and down;

wherein when the tray moves to a high position, the driving device is further configured to drive the tray to rotate to a position where one of the measuring cups to be measured is in alignment with the pair of scales;

wherein the driving device comprises:

a base;

a driving cylinder secured onto the base and configured to vertically extend and retract;

a support fixedly connected to a telescopic end of the driving cylinder; and a driving unit secured onto the support, an output shaft of the driving unit being connected to a center support member of the tray in a driving manner.

16. The equipment according to claim 15, wherein the driving device further comprises a vertical guiding rod secured onto the base, and the support is slidingly fitted to the vertical guiding rod.

17. The equipment according to claim 16, wherein a linear bearing is arranged between the support and the vertical guiding rod.

18. The equipment according to claim 15, wherein the driving cylinder comprises a hydraulic cylinder or a pneumatic cylinder, and the driving unit comprises a motor or an electric machine.

19. The equipment according to claim 15, wherein when there are at least two pairs of scales, each pair of scales is secured onto a support platform which is secured onto the base; each pair of scales is provided with a cup holder, and top surfaces of the cup holders are located at an identical level.

* * * * *